United States Patent [19]

Wagener et al.

[11] Patent Number: 5,536,408
[45] Date of Patent: Jul. 16, 1996

[54] HYDROPHILIC, ASYMMETRIC, CHEMICALLY-RESISTANT POLYARAMIDE MEMBRANE

[75] Inventors: Reinhard Wagener, Kelkheim; Jürgen Schneider, Waldems; Ulrich Delius, Frankfurt am Main; Friedrich Herold, Hofheim am Taunus; Georg-Emerich Miess, Regensburg; Ulrich Meyer-Blumenroth, Idstein/Taunus, all of Germany

[73] Assignee: Hoechst Aktiengesellschaft, Germany

[21] Appl. No.: 335,670

[22] Filed: Nov. 8, 1994

Related U.S. Application Data

[63] Continuation of Ser. No. 970,482, Oct. 23, 1992, abandoned.

[30] Foreign Application Priority Data

Oct. 26, 1991 [DE] Germany ............... 41 35 342.0

[51] Int. Cl.$^6$ .................. B01D 69/10; B01D 71/56
[52] U.S. Cl. ............... 210/490; 210/500.23; 210/500.38
[58] Field of Search ............... 210/321.6, 321.75, 210/490, 491, 500.23, 500.38, 500.39, 500.3, 655; 96/13, 14; 428/474.4; 528/183, 185, 340, 348

[56] References Cited

U.S. PATENT DOCUMENTS

| | | | |
|---|---|---|---|
| 3,615,024 | 10/1971 | Michaels | 210/490 |
| 4,045,337 | 8/1977 | Knickel et al. | 210/500.38 |
| 4,181,637 | 1/1980 | Busch et al. | 260/16 |
| 4,229,291 | 10/1980 | Walch et al. | 210/500.38 |
| 4,720,343 | 1/1988 | Walch et al. | 210/500.38 |
| 4,891,135 | 1/1990 | Haubs et al. | 210/500.38 |
| 4,931,533 | 6/1990 | Herold | 528/185 |
| 4,987,215 | 1/1991 | Keil et al. | 528/329.1 |
| 4,987,216 | 1/1991 | Keil et al. | 528/329.1 |
| 4,987,217 | 1/1991 | Keil et al. | 528/340 |
| 5,097,015 | 3/1992 | Miess et al. | 528/331 |
| 5,124,436 | 6/1992 | Keil et al. | 528/331 |
| 5,128,440 | 7/1992 | Keil et al. | 528/337 |
| 5,152,894 | 10/1992 | Haubs et al. | 210/500.38 |
| 5,174,899 | 12/1992 | Bahrmann et al. | 210/651 |

FOREIGN PATENT DOCUMENTS

| | | | |
|---|---|---|---|
| 0082433 | 6/1983 | European Pat. Off. | 210/500.38 |
| 0322837 | 7/1989 | European Pat. Off. | 210/500.38 |
| 0325962 | 8/1989 | European Pat. Off. | 210/500.38 |
| 0382009 | 8/1990 | European Pat. Off. | 210/500.37 |
| 442399 | 8/1991 | European Pat. Off. | 528/340 |
| 0445673 | 9/1991 | European Pat. Off. | 210/500.38 |
| 2231711 | 12/1974 | France | 210/500.38 |
| 07834584 | 2/1992 | Germany | 210/500.38 |
| 07905893 | 6/1992 | Germany | 210/500.38 |
| WO88/08738 | 11/1988 | WIPO | 210/500.38 |

OTHER PUBLICATIONS

S. Souriragan, Reverse Osmosis, Logos Press, London 1970, pp. 55–65.
W. Pusch et al., Desalination, vol. 35 (1980), pp. 5–21.
R. E. Kesting, Synthetic Polymeric Membranes, 2nd Ed., (1985), pp. 237–286.

*Primary Examiner*—Joseph W. Drodge
*Attorney, Agent, or Firm*—Curtis, Morris & Safford

[57] ABSTRACT

A macroporous, asymmetric, hydrophilic membrane is described, which contains a copolyamide which has the following recurring structural units:

(A) —OC—Ar$^1$—CO— and also three different structural units of those mentioned below:

(B) —NH—Ar$^2$—NH—

(C) —NH—Ar$^3$—NH—

(D, E, F) —NH—Ar$^2$—Z—Ar$^3$—NH— where the symbols Ar$^1$, Ar$^2$, Ar$^3$ and Z have the following meaning:

Ar$^1$ is a 1,4-phenylene or another bivalent $C_6$–$C_r$ aromatic or heteroaromatic radical in which radical the bonds are in para or comparable coaxial or antiparallel position, Ar$^2$ and Ar$^3$ are 1, 2 phenylene, 1,3-phenylene or 1, 4-phenylene radicals and Z is one of the following bivalent radicals —O—, —$CH_2$—, —$C(CH_3)_2$, —$C(CF_3)_2$—, —$SO_2$—, —NHCO—, or —O—Ar$^2$—O—.

13 Claims, No Drawings

HYDROPHILIC, ASYMMETRIC, CHEMICALLY-RESISTANT POLYARAMIDE MEMBRANE

This application is a continuation of application Ser. No. 07/970,482, filed Oct. 23, 1992, now abandoned.

The invention relates to macroporous, asymmetric, hydrophilic membranes containing polyaramide and to a process for their production.

Since the introduction of asymmetric membranes of cellulose acetate by Loeb and Sourirajan (S. Sourirajan, Reverse Osmosis, Logos Press, London 1970) and of hydrophobic polymers (U.S. Pat. No. 3,615,024) a number of membranes have been developed and proposed, in particular for separations of low and high molecular constituents dissolved in water, the structure and suitability of which are given in the literature (Desalination, 35 (1980), 5–20) and which have also been successfully tested in industrial practice or for clinical purposes.

Many of the membranes described have particularly advantageous properties for achieving specific tasks. As a result of their chemical constitution and their structure, each individual membrane can be optimally suited only for quite specific separation problems. From this results the fundamental requirement of continuously developing new membranes for new tasks.

EP-A 0 082 433 gives an overview of the advantages and disadvantages of membranes which are already known. Thus, for example, there are hydrophilic, asymmetric membranes of cellulose acetate having satisfactory antiadsorptive properties, but whose thermal and chemical stability leave a lot to be desired. Membranes of polysulfones or similar polymers do possess a good thermal and chemical stability, but such membranes, because of the hydrophobic properties of the polymers used, nevertheless show a pronounced tendency to adsorb dissolved substances, as a result of which the membrane is virtually blocked. The mixtures of polysulfone polyvinylpyrrolidone disclosed in EP-A 0 082 433 do eliminate the disadvantage resulting from the hydrophobicity of the polysulfone, but these mixtures are sensitive to the action of organic solvents.

Hydrophilicity and simultaneous resistance to solvents are found in membranes of regenerated cellulose; but these can be relatively easily hydrolyzed in acid or alkaline media, and moreover they are easily attacked by microorganisms.

It is the object of the invention to produce macroporous asymmetric membranes, which have pronounced hydrophilic properties, i.e. are capable of absorbing considerable quantities of water, relative to their total weight, which are resistant to hydrolyzing and oxidizing agents and also to the action of heat, which withstand organic solvents better than membranes of hydrophobic polymer, which have a good wettability and are also insensitive to the action of microorganisms.

This object is achieved by a membrane of the type mentioned in the introduction, whose distinguishing characteristics are that it contains a copolyamide which has the following recurring structural units:

(A) —OC—$Ar^1$—CO— and also three different structural units of those mentioned below:

(B) —NH—$Ar^2$—NH—

(C) —NH—$Ar^2$—NH—

(D, E, F) —NH—$Ar^2$—Z—$Ar^3$—NH—

The symbols $Ar^1$, $Ar^2$, $Ar^3$ and Z have here the following meaning:

—$Ar^1$— is a 1,4-phenylene or another bivalent $C_6$–$C_{12}$-aromatic or heteroaromatic radical, possibly containing sulfonic acid groups or ether bridges, in which radical the bonds are in para or comparable coaxial or antiparallel position and which radical is unsubstituted or substituted by one or two branched or unbranched $C_1$–$C_4$ alkyl or $C_1$–$C_4$ alkoxy radicals or by one or more halogens, for example chlorine, fluorine or bromine;

—$Ar^2$— and —$Ar^3$— are identical or different 1,2-phenylene, 1,3-phenylene or 1,4-phenylene radicals, which are unsubstituted or substituted by one or two branched or unbranched $C_1$–$C_4$ alkyl or $C_1$–$C_4$ alkoxy radicals or by one or more halogens, for example chlorine, fluorine or bromine;

—Z— is one of the following bivalent radicals —O—, —$CH_2$—, —$C(CH_3)_2$—, —$C(CF_3)_2$—, —$SO_2$—, —NHCO— or —O—$Ar^2$—O—, where —$Ar^2$— has the meaning given above.

According to the invention, therefore, three diamine components are necessary for the formation of the copolyamides contained in the membrane. Membranes of a similar type have already been described in EP-A 0 325 962. In contrast thereto, the membranes according to the invention are distinguished, in particular, by an increase in the solubility of the membrane-forming polyaramides in polar aprotic solvents of the amide type. This simplifies on the one hand the processing of the polymer solutions and the production of the membranes according to the invention and gives, on the other hand, those skilled in the art the possibility of specifically varying the properties of the membranes according to the invention in a wide range.

Furthermore, the monomers used for the preparation of the polyaramides described below are less toxic than those listed in EP-A 0 325 962. This considerably simplifies the preparation of the polyaramide solutions used for the production of the membranes.

The copolyamides described below are not per se subject matter of the present invention, but have already been described in connection with molded bodies in the following literature: EP-A 0 322 837, EP-A 0 445 673, and also in the German Applications P 41 04 394 and P 41 21 801, which have earlier priority, but which had not been published at the date of filing of the present application. However, the amounts of the diamines used can deviate from those mentioned there in order to achieve optimal membrane properties.

In order to achieve optimal membrane properties, the diamines should preferably have the following concentrations:

Diamine (B): 0 to 50 molar %

Diamine (C): 0 to 60 molar %

Diamine (D), (E), (F): 10 to 70 molar % (per diamine unit (D), (E) and/or (F))

based on 100 molar % of the acid component (A) used, the ratio of the diamine components to the acid component being 0.90:1.10 to 1.10:0.90, preferably 1:1.

To prepare the copolyamides required according to the invention, the following compounds are suitable:

Dicarboxylic acid derivatives of the formula (A') Cl—CO—$Ar^1$—CO—Cl for example 4,4'-diphenyl sulfone dicarbonyl dichloride, 4,4'-diphenyl ether dicarbonyl dichloride, 4,4'-diphenyldicarbonyl dichloride, 2,6-naphthalenedicarbonyl dichloride, 2,5-furandicarbonyl dichloride, in particular terephthalyl dichloride.

Aromatic diamines of the structure (B') H$_2$N—Ar$^2$—NH$_2$ for example substituted or unsubstituted p-phenylenediamines such as for example 2-chloro-, 2,5-dichloro- or 2-methoxy-p-phenylenediamine.

Aromatic diamines of the structure (C') H$_2$N—Ar$^3$—NH$_2$ for example substituted or unsubstituted m-phenylenediamines such as for example 5-methoxy-m-phenylenediamine or 5-chloro-m-phenylenediamine.

As representatives of diamine components of the structure (D', E', F') H$_2$N—Ar$^2$—Z—Ar$^3$—NH$_2$ for example, 4,4'-diaminodiphenylmethane, 2,2-bis-(4-aminophenyl)propane, hexafluoro-2,2-bis(4-aminophenyl)propane, 4,4'-diaminodiphenyl ether, in particular 3,4'-diaminodiphenyl ether and also 4-aminobenz-(4'-amino)anilide, and particularly preferably 1,4-bis(4-aminophenoxy)benzene, may be mentioned.

The solution condensation of the aromatic dicarboxylic dichlorides with the mixtures of the aromatic diamines is carried out in aprotic, polar solvents of the amide type, such as for example in N,N-dimethylacetamide or, in particular, in N-methyl-2-pyrrolidone. If desired, halide salts selected from the first and second group of the Periodic Table of the Elements can be added to these solvents in a known manner to increase the solution capacity of or to stabilize the polyamide solutions. Preferred additions are calcium chloride and/or lithium chloride.

The polycondensation temperatures are conventionally between $-20°$ C. and $+120°$ C., preferably between $+10°$ C. and $+100°$ C. Particularly good results are achieved at reaction temperatures between $+10°$ C. and $+80°$ C. The polycondensation reactions are preferably carried out so that after the reaction is completed, 1 to 40% by weight, preferably 3.55 to 25% by weight, of polycondensate is in the solution.

The polycondensation can be terminated in a conventional manner, for example by addition of monofunctional compounds, such as benzoyl chloride. After completion of the polycondensation, i.e. when the polymer solution has attained the Staudinger index required for further processing, the hydrogen chloride formed loosely bound to the amide solvent is neutralized by addition of basic substances. Suitable substances for this are for example lithium hydroxide, calcium hydroxide, in particular calcium oxide.

The Staudinger index, which is a measure of the mean chain length of the resulting polymer, is, for the membrane-forming copolyamides, between 50 and 1,000 cm$^3$/g, preferably between 100 and 500 cm$^3$/g, particularly preferably between 150 and 350 cm$^3$/g. It was determined in solutions each containing 0.5 g of polymer in 100 ml of 96% strength sulfuric acid at 25° C.

The Staudinger index $[\eta]$ (limiting viscosity, intrinsic viscosity) is taken to mean the expression $$\lim_{C_2 \to 0} \frac{\eta_{sp}}{C_2} = [\eta]$$

$$\eta_{sp} \frac{\eta}{\eta_1} -1$$

where $C_2$=concentration of the dissolved substance $\eta_{sp}$=specific viscosity $\eta$=viscosity of the solution $\eta_1$=viscosity of the pure solvent.

The copolyamides described above are not per se subject matter of the present invention, but the invention rather relates to a semipermeable macroporous membrane containing the polyamides mentioned composed of the amine components (B), (C), (D), (E) and/or (F) and the acid components of the formula (A).

To produce the membrane according to the invention from copolyamides, the copolyamide solution already described is filtered, degassed, and then, in a known manner using then phase inversion process (Robert E. Kesting, "Synthetic Polymeric Membranes", 2nd Ed., 1985, p. 237 ff.), an asymmetric macroporous membrane is produced. For this purpose the polymer solution is spread as a liquid layer on a support as flat as possible. The flat support can for example comprise a glass plate or a metal drum.

A precipitant liquid is then allowed to act on the liquid layer, which precipitant liquid is miscible with the solvent of the solution, but in which the polymers dissolved in the polymer solution are precipitated as a membrane. The copolyamide solvents here contain aprotic, polar solvents of the amide type, for example N,N-dimethylacetamide or, in particular, N-methyl-2-pyrrolidone, as chief constituent. Further solvent constituents which may be used are readily volatile substances, such as for example tetrahydrofuran, acetone or methylene chloride.

Suitable precipitant liquids are water, mono- or polyhydric alcohols such as methanol, ethanol, isopropanol, ethylene glycol or glycerol, or, additionally, mixtures of these substances with each other or with aprotic, polar solvents such as N,N-dimethylformamide, N,N-dimethylacetamide, dimethyl sulfoxide, but in particular with N-methyl-2-pyrrolidone.

As a result of the action of the precipitant liquid on the liquid layer of (the) polymer solution the copolyamides dissolved in this solution are precipitated out with the formation of a macroporous membrane having an asymmetric pore structure. The separation efficiency and the rejection efficiency of the membranes according to the invention can be specifically varied by addition of polyvinylpyrrolidone (PVP) to the solution of the copolyamide prior to the coagulation or by carrying out the polycondensation of aromatic diamines with aromatic dicarboxylic acid derivatives in the presence of polyvinylpyrrolidone or by a subsequent treatment, i.e. following the coagulation after virtually all of the solvent (>95%) has been replaced by precipitant liquid, at a temperature in the range from 60°–100° C., with a liquid, for example water, mono or polyhydric alcohols or polar, aprotic solvents of the amide type, such as N-methylpyrrolidone, N,N-dimethylformamide, dimethyl sulfoxide or mixtures of these liquids with each other or alternatively by a treatment with possibly superheated steam (>100° C.).

When there is an addition of polyvinylpyrrolidone, this is added in amounts of 1 to 80% by weight, preferably 5 to 70% by weight, particularly preferably 20 to 60% by weight, relative to the mass of the polyamide. The molecular weight of the polyvinylpyrrolidone in this case is in the range from 1,000 to 2,000,000 daltons (g/mol) (given as weight average), preferably in the range from 20,000 to 1,000,000, particularly preferably in the range from 30,000 to 95,000 daltons.

When the process is carried out, the precipitant liquid can be advantageously allowed to act on the membrane precipitated by this, until virtually all of the solvent in the membrane has been replaced by precipitant liquid. The membrane formed is then freed from precipitant liquid, for example by drying the membrane directly in an airstream having a relative humidity in the range from 20 to 100% or by first treating it with a plasticizer such as glycerol, and then drying it.

To produce membranes which are arranged on a support layer, which is permeable to flowable media, the procedure as described above is carried out but the support used for forming the membrane layer is a nonwoven web, for example of plastic or paper and after the membrane layer has been formed this is left on the support. However, the membrane can alternatively be first prepared without a support and only then applied to a permeable support. Flat membranes produced in this manner have a thickness in the range from 10 to 300 μm, in particular in the range from 20 to 150 μm.

In a known manner, hollow fibers and capillaries can alternatively be produced from the solution of the copolyamides, by spinning the polymer solution in accordance with the prior art through an appropriately designed shaping ring nozzle or hollow needle nozzle into a precipitant liquid. The wall thickness of such capillaries or hollow fibers is in the range from 20 to 500 μm, but in particular between 150 and 350 μm.

If the membrane is soaked in glycerol after the coagulation, it can contain glycerol for example in the range from 5 to 60%, relative to its total weight; the membrane impregnated in this manner is dried, for example at a temperature in the range from 30°–80° C.

The membrane according to the invention, apart from standard applications of porous membranes known to those skilled in the art, such as pressure filtration (micro-, nano- and ultrafiltration), diafiltration and dialysis is likewise suitable as a support membrane for selectively permeable layers which are produced directly on or in the membrane. Thus for example "ultrathin" layers ($\leq 1$ μm) composed of polymers having functional groups (for example silicones, cellulose ethers, fluorine copolymers) can be spread on water, applied to the membrane surface from there and for example can be covalently fixed by reaction with a diisocyanate, in order to achieve more selective permeability by this means. By analogy, the membranes according to the invention are also suitable as supports for reactive molecules, for example to fix enzymes or anticoagulants such as heparin according to the prior art.

The thickness of the membranes according to the invention without a support layer is in the range from 10 to 300 μm, in particular from 20 to 120 μm.

EXAMPLE 1

For the production of the membrane, a copolyamide, in N-methylpyrrolidone (NMP) as solvent, was prepared from (A') 100 molar % terephthalyl dichloride (TPC), (B') 37.5 molar % paraphenylenediamine (PPD), (D') 25 molar % 4-aminobenz(4-amino)anilide and (E') 37.5 molar % 1,4-bis(4-aminophenoxy)benzene at a temperature of 70° C. The concentration of the solution was 6% (parts by weight based on a 100 parts by weight solution). A solution of this copolyamide was applied to a polypropylene support nonwoven web and coagulated in water at 20° C.

The hydraulic permeability (ultrafiltration) and the rejection efficiency against dissolved macromolecules were determined at pressures of 3.0 bar at 20° C. in a stirred cylindrical cell (500 rpm, 250 ml, membrane surface area 38 cm$^2$).

The rejection efficiency is by definition $$R = \frac{C_1 - C_2}{C_1} \cdot 100 \, [\%]$$

$C_1$ is the concentration of the aqueous test solution, $C_2$ is the concentration in the permeate.

The test solution used was a 2% strength aqueous polyvinylpyrrolidone solution (PVP), available under the name "®Kollidon K30" from the BASF company (PVP K30); the molar mass of the polyvinylpyrrolidone was 49,000 daltons. In addition, 1% strength aqueous solutions of fractionated dextrans having molar masses of 10,000, 40,000 and 70,000 were used, available under the names Dextran T10, Dextran T40 and Dextran T70 from the Pharmacia company. The density measurements were carried out using a density measuring apparatus ®DA 210 from the Kyoto Electronics company.

The hydraulic permeability was 320 l/m$^2$h the rejection for PVP K30 was R=87%, that for Dextran T10 was R=18%.

EXAMPLE 2

The polymer solution prepared in Example 1 was diluted to a concentration of 5% by addition of NMP, the diluted solution was applied to a polyethylene terephthalate support web and was coagulated in water at 18° C. The water-wet membrane was then subjected for 14 hours to the action of a solution of 50% glycerol and 50% water and was then dried in a dry airstream at 50° C. for 1 hour. Under the conditions mentioned in Example 1, a hydraulic permeability of 280 l/m$^2$h and a rejection efficiency of R=87% were measured for PVP K30. The rejection for Dextran T10 was R=49%.

EXAMPLE 3

For the production of the membrane studied in the example, a copolyamide was prepared in N-methylpyrrolidone as solvent from (A') 100 molar % terephthalyl dichloride, (B') 50 molar % paraphenylenediamine, (D') 37.5 molar % metaphenylenediamine and (E') 12.5 molar % 1,4-bis(4-aminophenoxy)benzene at a concentration of 10% at a temperature of 70° C. A solution of this copolyamide was applied to a polypropylene support web and coagulated in water at 20° C. Under the conditions listed in Example 1, a hydraulic permeability of 140 l/m$^2$h and a rejection efficiency of R=92% were measured for PVP K30, R=70% was measured for Dextran T40 and R=40% was measured for Dextran T10.

EXAMPLE 4

A sample of the copolyamide solution prepared in Example 3 was applied to a polyphenylene sulfide support web and was precipitated in a glycerol/water mixture (1:1) at a temperature of 20° C. Under the measurement conditions of Example 1, a hydraulic permeability of 55 l/m$^2$h and a rejection efficiency for PVPK30 of R=86% resulted, for Dextran T40 R=68% resulted, and for Dextran T10 R=37% resulted.

EXAMPLE 5

The copolyamide solution prepared in Example 3 was applied to a polypropylene support web and coagulated in isopropanol at a temperature of 22° C. A hydraulic permeability of 10 l/m²h and a rejection efficiency of R≦99% was measured for Dextran T40 and PVP K30, and also R=98% for Dextran T10, under the conditions of Example 1.

EXAMPLE 6

The copolyamide solution prepared in Example 3 was diluted to a concentration of 8% by addition of NMP, applied to a polypropylene support web and coagulated in a mixture, each of 50 percent by mass, of N-methylpyrrolidone and water at a temperature of 20° C. According to the method described in Example 1, a hydraulic permeability of 100 l/m²h and a rejection efficiency of R=43% for PVP K30 and R=8% for Dextran T40 were determined.

EXAMPLE 7

The copolyamide solution prepared in Example 3 was diluted to a concentration of 6% by addition of NMP, used to coat a polyethylene terephthalate support web and precipitated in water at 21° C. The measurements carried out according to Example 1 gave a hydraulic permeability of 800 l/m²h and rejection efficiencies of R=60% for PVP K30 and R<5% for Dextran T40.

EXAMPLE 8

For the production of the membrane studied in the example, a copolyamide was prepared, in N-methylpyrrolidone as solvent, from (A') 100 molar % terephthalyl dichloride (B') 25 molar % paraphenylenediamine (D') 25 molar % 4-aminobenz(4'-amino)anilide and (E') 50 molar % 3,4'-diaminodiphenyl ether at a concentration of 6% at a temperature of 60° C. This solution was used to coat a polypropylene support web and was precipitated at 15° C. in water. The measurements described in more detail in Example 1 gave a hydraulic permeability of 140 l/m²h and rejection efficiencies of R=88% for PVP K30 and R=55% for Dextran T40.

EXAMPLE 9

A solution of a copolyamide was prepared in N-methylpyrrolidone by condensation of (A') 100 molar % terephthalyl dichloride (B') 50 molar % paraphenylenediamine (D') 25 molar % 4,4'-diaminodiphenylmethane and (E') 25 molar % 3,4'-diaminodiphenyl ether at a temperature of 70° C. The concentration of the solution was 7%. The solution was applied to a polyethylene terephthalate support web and was coagulated at 18° C. in water. According to the method described in Example 1, a hydraulic permeability of 170 l/m²h and a rejection efficiency for PVP K30 of R=83% and for Dextran T10 of R=27% were measured.

EXAMPLE 10

The membrane produced in Example 1 was subjected to a 10 minute-long treatment in water at 80° C. According to the method mentioned in Example 1, a hydraulic permeability of 440 l/m²h and rejection efficiencies of R=93% for PVP K30 and R=29% for Dextran T10 were measured. A further sample of the membrane was subjected to a 10 minute treatment in water at 100° C. A hydraulic permeability of 220 l/m²h and rejection efficiencies for PVP K30 of R=94% and for Dextran T10 of R=69% resulted.

EXAMPLE 11

2.5 g of polyvinylpyrrolidone ®Kollidon K30 were stirred into 100 g of the polyamide solution described in Example 1, the solution was applied to a polypropylene support web and was coagulated in water at 20° C. According to Example 1, a hydraulic permeability of 474 l/m²h and rejection efficiencies of R=76% for PVP K30 and R=10% for Dextran T10 were measured. This membrane was subjected to a treatment in water at 100° C. (10 min. A hydraulic permeability of 564 l/m²h and rejection efficiencies of R=87% for PVP K30 and R=51% for Dextran T10 were then found.

EXAMPLE 12

The membrane prepared in Example 3 was treated for 10 minutes in water at 100° C. According to Example 1, a hydraulic permeability of 200 l/m²h and rejection efficiencies of R=96% for PVP K30, R=83% for Dextran T40 and R=69% for Dextran T10 were determined.

EXAMPLE 13

The copolyamide solution prepared in Example 3 was diluted by addition of a solution of PVP "®Kollidon K30" (BASF) in NMP so that a solution containing 8% copolyamide and 4% PVP K30, based on the total mass of the solution, resulted. The solution was coated on a polyethylene terephthalate support web to give a thin layer and was coagulated out in water at 22° C. According to the method described in Example 1, a hydraulic permeability of 1,500 l/m²h and rejection efficiencies for PVP K30 of R=72% and for Dextran T40 of R=6% were determined.

The membrane was treated for 10 minutes in water at 100° C. The hydraulic permeability was then 600 l/m²h, the rejection efficiencies were R=91% for PVP K30 and R=30% for Dextran T40.

| Ex. | Amine composition/ additions or thermal treatment | Conc. [%] | Permeability [l/m²h] hydraulic | Rejection efficiencies [%] K30 | T10 | T40 |
|---|---|---|---|---|---|---|
| 1* | B' = 37.5 molar % D' = 25 molar % E' = 37.5 molar % | 6 | 320 | 87 | 18 | |
| 2° | as 1 | 5 | 280 | 87 | 49 | |
| 3* | B' = 50 molar % C' = 37.5 molar % D' = 12.5 molar % | 10 | 140 | 92 | 40 | 70 |
| 4° | as 3 | 10 | 55 | 86 | 37 | 68 |

-continued

| Ex. | Amine composition/ additions or thermal treatment | Conc. [%] | Permeability [l/m²h] hydraulic | Rejection efficiencies [%] K30 | T10 | T40 |
|---|---|---|---|---|---|---|
| 5* | as 3 | 10 | 10 | ≧99 | 98 | ≧99 |
| 6* | as 3 | 8 | 100 | 43 | | 8 |
| 7° | as 3 | 6 | 800 | 60 | | <5 |
| 8* | B' = 25 molar % D' = 25 molar % E' = 50 molar % | 6 | 140 | 88 | | 55 |
| 9* | B' = 50 molar % D' = 25 molar % E' = 25 molar % | 7 | 170 | 83 | 27 | |
| 10* | as 1 H₂O (80° C.) H₂O (100° C.) | 6 | 440 220 | 93 94 | 29 69 | |
| 11* | as 1 addition 2.5% K30 H₂O (100° C.) | 6 | 474 564 | 76 87 | 10 51 | |
| 12* | as 1 H₂O (100° C.) | 10 | 200 | 96 | 69 | 83 |
| 13° | as 3 8% copolyamide/ 4% K30 H₂O (100° C.) | 8 | 1,500 600 | 72 91 | 6 30 | |

*PP (polypropylene) support web
°PET (polyethylene terephthalate) support web
K30 Polyvinylpyrrolidone ®Kollidon K30
T10, T40 Aqueous dextran solutions having molar masses of 10,000 and 40,000 respectively

We claim:

1. A macroporous, asymmetric, hydrophilic membrane, which contains a copolyamide which has the following recurring structural units:

(A), where (A) is —OC—Ar¹—CO— and also three different diamine structural units selected from the group consisting of (B), (C), (D), (E) and (F), or mixtures thereof, and where:

(B) is —NH—AR²—NH— and where the concentration of diamine unit (B) is in the range of from 0 to 50 molar %;

(C) is —NH—Ar³—NH— and where the concentration of diamine unit (C) is in the range of from 0 to 60 molar %;

(D, E, F) are —NH—Ar²—Z—Ar³—NH— and where the per diamine unit concentration of diamine units (D), (E) and/or (F) is in the range of from 10 to 70 molar % based on 100 molar % of acid unit (A) used, the ratio of the diamine units (B), (C), (D), (E) and/or (F) to the unit (A) cumulatively being 0.90:1.10 to 1.10:0.90; and where —Ar¹— is a 1,4-phenylene or another bivalent $C_6$–$C_{12}$-aromatic or heteroaromatic radical, which optionally contains sulfonic acid groups or ether bridges, in which radical the bonds are in para or comparable coaxial or antiparallel position and which radical is unsubstituted or substituted by one or two branched or unbranched $C_1$–$C_4$ alkyl or $C_1$–$C_4$ alkoxy radicals or by one or more halogen atoms;

—Ar²— and —Ar³— are identical or different 1,2-phenylene, 1,3-phenylene or 1,4 phenylene radicals, which are unsubstituted or substituted by one or two branched or unbranched $C_1$–$C_4$ alkyl or $C_1$–$C_4$ alkoxy radicals; and —Z— is selected from the group consisting of the bivalent radicals —O—, —CH₂—, —C(CH₃)₂—, —C(CF₃)₂—, —SO₂—, —NHCO— and —O—Ar²—O—, or mixtures thereof, where —Ar²— has the meaning given above.

2. The membrane as claimed in claim 1, wherein the unit A is selected from the group consisting of 4,4'-diphenyl sulfone dicarbonyl dichloride, 4,4'-diphenyl ether dicarbonyl dichloride, 4,4'-diphenyldicarbonyl dichloride, 2,6-naphthalenedicarbonyl dichloride, 2,5-furandicarbonyl dichloride, and terephthalyl dichloride.

3. The membrane as claimed in claim 1, wherein the diamine unit B is p-phenylenediamine.

4. The membrane as claimed in claim 1, wherein the diamine unit C is selected from the group consisting of 5-methoxy-m-phenylenediamine, 5-chloro-m-phenylenediamine and m-phenylenediamine or mixtures thereof.

5. The membrane as claimed in claim 1, wherein the diamine units D, E, and F is selected from the group consisting of 4,4'-diaminodiphenylmethane, 2,2-bis (4-aminophenyl) propane, 4,4'-diaminodiphenyl ether, 3,4'-diaminodiphenyl ether, 4-aminobenz (4'-amino) anilide and 1,4-bis-(4-aminophenoxy) benzene or mixtures thereof.

6. The membrane as claimed in claim 1, wherein the copolyamide has a Staudinger index in the range from 50 to 1,000 cm³/g.

7. The membrane as claimed in claim 1, wherein the membrane is a flat membrane having a thickness in the range from 10 to 300 μm.

8. The membrane as claimed in claim 7, wherein the membrane is arranged on a support layer, comprised of synthetic web or paper, permeable to flowable media.

9. The membrane as claimed in claim 1, wherein the membrane is a hollow fiber membrane.

10. The membrane as claimed in claim 1, wherein the copolyamide has a Staudinger index in the range from 100 to 500 cm³/g.

11. The membrane as claimed in claim 1, wherein the copolyamide has a Staudinger index in the range from 150 to 350 cm³/g.

12. The membrane as claimed in claim 1, wherein the membrane is a flat membrane having a thickness in the range from 20 to 150 μm.

13. A macroporous, asymmetric, hydrophilic membrane for micro-, nano- and ultrafiltration which contains a copolyamide which has the following recurring structural units:

(A) where (A) is —OC—AR$^1$—CO— and also three different diamine structural units selected from the group consisting of (B), (C) and (D), or mixtures thereof, and where:

(B) is —NH—para-phenylene—NH—

(C) is —NH—meta-phenylene—NH—

(D) is —NH—Ar$^2$—O—Ar$^4$—O—Ar$^3$—NH— where

—Ar$^1$— is a 1,4 phenylene or another bivalent C$_6$–C$_{12}$- aromatic or heteroaromatic radical, which optionally contains sulfonic acid groups or ether bridges, in which radical the bonds are in para or comparable coaxial or antiparallel position and which radical is unsubstituted or substituted by one or two branched or unbranched C$_1$–C$_4$ alkyl or C$_1$–C$_4$ alkoxy radicals or by one or more halogen atoms; and —Ar$^2$—, —Ar$^3$— and —Ar$^4$— are 1,4-phenylene which is unsubstituted or substituted by one or two branched or unbranched C$_1$–C$_4$ alkyl- or alkoxy radicals.

* * * * *

UNITED STATES PATENT AND TRADEMARK OFFICE
CERTIFICATE OF CORRECTION

PATENT NO. : 5,536,408

DATED : July 16, 1996

INVENTOR(S) : Wagener et al.

It is certified that error appears in the above-identified patent and that said Letters Patent is hereby corrected as shown below:

<u>Column 1, line 61</u>, please delete "$Ar^2$" and insert therefor --$Ar^3$--; and <u>Column 7, line 1</u>, delete "rejection efficiency of $R \leq 99\%$" and insert therefor --rejection efficiency of $R \geq 99\%$--.

Signed and Sealed this

Seventeenth Day of December, 1996

Attest:

BRUCE LEHMAN

Attesting Officer     *Commissioner of Patents and Trademarks*